United States Patent [19]

Bentz

[11] Patent Number: 5,082,475

[45] Date of Patent: Jan. 21, 1992

[54] WASTE AIR PURIFICATION PROCESS

[75] Inventor: Rolf Bentz, Basel, Switzerland

[73] Assignee: Ciba-Geigy Corporation, Ardsley, N.Y.

[21] Appl. No.: 344,546

[22] Filed: Apr. 25, 1989

Related U.S. Application Data

[63] Continuation of Ser. No. 124,201, Nov. 23, 1987, abandoned.

[30] Foreign Application Priority Data

Dec. 5, 1986 [CH] Switzerland .................. 4864/86

[51] Int. Cl.$^5$ .............................................. B01D 53/04
[52] U.S. Cl. .......................................... 55/68; 55/74; 55/387
[58] Field of Search .................. 55/33, 62, 68, 74, 387

[56] References Cited

U.S. PATENT DOCUMENTS

| 2,790,511 | 4/1957 | Konrad | 55/74 |
|---|---|---|---|
| 3,204,388 | 9/1965 | Asker | 55/33 X |
| 3,216,905 | 11/1965 | Baptist | 55/74 X |
| 3,828,525 | 8/1974 | Copa et al. | 55/74 X |
| 3,897,226 | 7/1975 | Doherty | 55/62 X |
| 4,161,426 | 7/1979 | Kneer | 55/74 X |
| 4,229,188 | 10/1980 | Intille | 55/74 X |
| 4,345,973 | 8/1982 | Ladisch et al. | 55/62 X |
| 4,441,896 | 4/1984 | Bentz et al. | 55/85 |
| 4,662,900 | 5/1987 | Ottengraf | 55/90 |

FOREIGN PATENT DOCUMENTS

| 2423616 | 11/1975 | Fed. Rep. of Germany | 55/74 |
|---|---|---|---|
| 2605606 | 8/1977 | Fed. Rep. of Germany | 55/74 |
| 2809357 | 9/1979 | Fed. Rep. of Germany | 55/74 |
| 75670 | 6/1976 | Japan | 55/74 |
| 37632 | 10/1976 | Japan | 55/74 |
| 767 | 1/1977 | Japan | 55/74 |
| 65765 | 5/1977 | Japan | 55/74 |
| 71372 | 6/1977 | Japan | 55/74 |
| 31565 | 3/1978 | Japan | 55/74 |
| 40412 | 4/1981 | Japan | 55/74 |
| 53728 | 5/1981 | Japan | 55/74 |
| 2067092 | 7/1981 | United Kingdom . | |

OTHER PUBLICATIONS

European Search Report EP 87810704.
VDI-Richtlinien 3477 (1984).

*Primary Examiner*—Robert Spitzer
*Attorney, Agent, or Firm*—Kevin T. Mansfield

[57] ABSTRACT

A novel waste air purification process based on a buffer unit/biofilter system and equipment for carrying out this process are described.

21 Claims, No Drawings

WASTE AIR PURIFICATION PROCESS

This application is a continuation of application Ser. No. 124,201, filed 11/23/87, now abandoned.

The application relates to a novel process, to equipment and to the use thereof for the disposal and purification of waste air loaded with pollutants.

The use of biofilters for the purification of waste air is known. Thus, the processes for biological waste air purification in, for example, refuse-composting works or animal carcass utilization installations are mentioned in VDI guidelines 3477.

The units operating by these processes can, however, only degrade a defined quantity of organic load, depending on the filter volume and the throughput rate. Since they have only a very small buffer capacity or none at all, the concentration of undegraded pollutants rises correspondingly at increased loading. In other words, the biofilter units described there are unsuitable for use, where intermittent loadings with high pollutant concentrations occur.

A novel waste air purification process has now been developed which no longer has these disadvantages and can therefore also be used, without a risk of breakthrough, in sectors (for example the chemical industry, paint shops, foundries) where frequently concentration peaks in pollutantcontaining waste air arise.

The present invention thus relates to a process for the disposal and purification of waste air loaded with pollutants, which comprises passing the waste air through a system consisting of at least one biofilter and at least one buffer.

In the text which follows, pollutant-loaded waste air is to be understood as meaning gases, aerosols and vapours which occur, for example, in a concentrated form in industrial processes or tank farms, and in a form diluted with air in the ambient air or in the fume cupboards of laboratories or in production or storage buildings.

The pollutants here are inorganic or organic compounds. Preferably, they are organic compounds, for example hydrocarbons or halogenated hydrocarbons, for example alkanes or cycloalkanes having 1 to 12 carbon atoms, or aromatics, aldehydes, ketones, ethers, carboxylic acid esters, sulfones, alcohols, thiols, nitro compounds or amino compounds, or mixtures. Especially these are, for example, butane, pentane, heptane, octane, cyclohexane, cyclooctane, decalin, methylene chloride, benzene, toluene, phenol, xylene, chlorobenzene, dichlorobenzene, acetone, dioxane, sulfolan, tetrahydrofuran, methyl isobutyl ketone, methanol, ethanol, butanol, pyridine, dimethylformamide, acetonitrile or mixtures.

Inorganic compounds which may be mentioned are, for example, $H_2S$, $NH_3$ and $HCN$.

The degradation of the waste air takes place in the biofilters. These biofilters contain microorganisms, for example from the activated sludge of effluent treatment plants, and a carrier material which can adequately supply the microorganisms with nutrients.

The carrier materials used are, for example, compost, peat, earth, wood chips, plant residues such as brushwood, straw, bark or heather, or mixtures, preferably a mixture of fibrous peat, heather and fir brushwood.

Since the microbiological degradation takes place in the aqueous phase, the carrier material must be moist. This can be accomplished, if necessary, by a device for moistening the biofilters, preferably by passing the waste air through a humidifier, before it enters the biofilter, or by injecting water through a nozzle into the waste air stream.

At the same time, the pollutant-containing waste air stream, which may be hot or highly concentrated, can be brought to a temperature and dilution which are harmless to the microorganisms in the biofilters.

For example, 1 $m^3$ of waste air of a pollutant concentration of up to 50 g is passed through per $m^3$ of biofilter volume and per hour.

The temperature of the waste air is preferably 15 to 40° C.

It is essential to the process according to the invention that at least one buffer is present in the biofilter system.

This or these buffer(s) can be arranged upstream of, between or upstream of and between biofilters, of which there may be several.

The pollutants or pollutant mixtures, which may arise intermittently, pass with the waste air into the buffer, are stored there and are released continuously to a biofilter system.

The buffer volume/biofilter volume ratio is, for example, between 50:1 and 1:50.

In a preferred embodiment, the buffer is arranged between at least two biofilters.

In this variant, the pollutants are first degraded in biofilters, of which there may be several, in accordance with their capacity. If the pollutant concentration in the waste air or the throughput rate thereof increases, a breakthrough occurs in the filter and the undegraded pollutants reach a buffer, of which there may be several.

When the pollutant quantity in the waste air subsides again, i.e. in a phase when no new substances pass into the buffer, since the upstream biofilter works again satisfactorily, the stored pollutants are continuously released to a biofilter, of which several may be provided downstream of the buffer, and are microbiologically decomposed therein.

When an adsorbent or mixture is used as a buffer, this procedure is self-regulating due to the establishment of the adsorbent/air phase equilibrium. Capacity for intercepting higher loadings is thus released by the continuous desorption taking place on the adsorbent.

The adsorbents used can, for example, be active charcoal or animal charcoal, silica gel, kieselguhr, bleaching earth, aluminas, molecular sieves, bauxite, glass, ceramics or mixtures, and especially active charcoal.

Furthermore, absorbents, for example high-boiling organic liquids which are homogeneously miscible with water, such as polyethylene glycol or polypropylene glycol, can also be used as the buffers. Further usable liquids and a process for absorptively separating off organic substances by means of these liquids are described in EP-75,536.

It is also essential to the invention that the more or less uniform release of pollutants from a buffer into a biofilter has the result that the microorganisms encounter ideal living conditions in this filter and are thus fully active at any time.

This application also relates to equipment for carrying out the process described above, which comprises a buffer unit/biofilter system.

The equipment according to the invention represents, for example, individual closed systems which can be arranged in the following way:

(a) there are one or more buffer units upstream of one or more biofilters,
(b) there are one or more buffer units between several biofilters or
(c) there are one or more buffer units upstream of and between several biofilters.

A layered arrangement, preferably in the manner of a chest of drawers, of the complete equipment (a) or (b) or (c) is also possible.

Advantageously, several biofilters, upstream of a buffer unit, are connected in parallel or arranged in the manner of a chest of drawers. During base load operation, the carrier material in the individual biofilters or drawers connected in parallel can then be readily exchanged or renewed. The capacity unavailable during the exchange is provided by the downstream buffer unit/biofilter system.

The efficiency of the equipment operating by the above process is between 90 and 99.5%, depending on the pollutant concentration and duration.

The above process or the equipment for carrying out the process can also be employed for controlled disposal, purification and separation of gases, aerosols and vapours, for example of non-reusable solvents or solvent mixtures arising in production.

The process according to the invention and the equipment for carrying out the process are thus distinguished by a universal and continuous applicability in the purification of pollutant-loaded waste air, and by excellent purification properties.

The example which follows illustrates the invention without restricting it thereto.

Example

1. Apparatus

The apparatus consists of two closed biofilters, between which a closed buffer is located. Each biofilter has a diameter of 0.12 m, a packed height of 0.9 m and a packed volume of 10 liters. The carrier used is a fibrous peat/ heather mixture. The buffer has a diameter of 0.06 m, a packed height of 0.45 m and a packed volume of 1.3 liters. The buffer is packed with active charcoal (Aerosorb F 40/470).

A pollutant-containing air stream is passed through this unit, the desired pollutant concentration in the air stream being produced in the following way:

A part of the air is passed via a rotameter through a gas wash bottle filled, for example, with a solvent, and the remaining air volume is passed via a rotameter through a temperature-controlled flask which is filled with distilled water for keeping the biofilter moist. The two air streams are combined before entering the biofilter.

The pollutant concentration before and after each stage is monitored by a FID measurement (flame ionization detector). 2 Test The residence time of the air is 36 seconds per biofilter and 4.6 seconds in the buffer. The air stream is at a temperature of 28° C., is loaded with toluene and is passed through the apparatus in a volume of 1 m$^3$ per hour.

During the entire test phase, the air volume remains constant, but the solvent concentration in the inlet air varies widely. The time for which a constant solvent concentration enters the system is also varied. In this way, a waste air stream is simulated, such as is obtained, for example, in chemical production. If the solvent is degraded in the biofilters, the solvent concentration downstream of the filter is smaller than upstream of the filter. The active charcoal, which is used as the buffer and on which there is non biodegradation, functions as follows:

at high solvent concentration in the inlet air, it acts as an adsorber. The concentration at the inlet is greater than that at the outlet;

at low solvent concentrations in the inlet air, the solvent is desorbed from the active charcoal, i.e. the concentration at the outlet is greater than that at the inlet.

At the start of the test, the active charcoal is loaded with toluene up to saturation.

TABLE 1

| Time [hours] | Pollutant concentration [mg/m$^3$] | | | | |
|---|---|---|---|---|---|
| | Inlet air | Bio-filter 1 outlet | Degradation % | Active Bio-charcoal filter 2 | | Degradation % |
| | | | | outlet | outlet | |
| 8,25 | 560 | 36 | 93,5 | 156* | 24 | 97 |
| 15,75 | 230 | 6 | 97,5 | 126 | 6 | 98 |
| 5,75 | 1260 | 660 | 47,5 | 150 | 6 | 99,5 |
| 19,5 | 230 | 6 | 97,5 | 116 | 5 | 98,5 |
| 6 | 1680 | 1080 | 36 | 120 | 6 | 99,5 |
| 16,5 | 225 | 6 | 97 | 150 | 6 | 98,5 |
| 8,5 | 3100 | 2980 | 4 | 480 | 300 | 92 |
| 64 | 300 | 30 | 90 | 240 | 6 | 99 |
| 3,3 | 1920 | 1320 | 31 | 210 | 30 | 98,5 |
| 15,8 | 160 | 6 | 96 | 80 | 6 | 97,5 |
| 8,5 | 2880 | 2090 | 27,5 | 480 | 120 | 96,5 |
| 16,75 | 560 | 360 | 36 | 50 | 6 | 99 |
| 7,35 | 4440 | 3840 | 13,5 | 1230 | 500 | 91 |
| 40 | 270 | 30 | 89 | 330 | 6 | 98 |
| 7,75 | 5220 | 4500 | 14 | 960 | 530 | 91 |

*At the underlined figures, desorption from the active charcoal occurs.

Example 2

The same test conditions and the same apparatus as in Example 1 are used, but with the difference that the air stream is loaded with methyl isobutyl ketone.

TABLE 2

| Time [hours] | Pollutant concentration [mg/m$^3$] | | | | |
|---|---|---|---|---|---|
| | Inlet air | Bio-filter 1 outlet | Degradation % | Active Bio-charcoal filter 2 | | Degradation % |
| | | | | outlet | outlet | |
| 15 | 700 | 390 | 44 | 65 | <10 | >98,5 |
| 33 | 1630 | 1030 | 37 | 820 | 730 | 55 |
| 15 | <10 | <10 | | 370 | 210 | |
| 24 | 2530 | 1970 | 22 | 1520 | 1310 | 48 |
| 16 | <10 | <10 | | 160 | 120 | |
| 23 | 1320 | 940 | 29 | 60 | 15 | 99 |
| 6 | 2560 | 2110 | 18 | 780 | 720 | 72 |
| 18 | <10 | <10 | | 340 | 250 | |
| 9 | 1980 | 1470 | 26 | 650 | 540 | 73 |
| 17 | <10 | <10 | | 370 | 270 | |
| 7 | 1750 | 1240 | 29 | 600 | 510 | 71 |

*At the underlined figures, desorption from the active charcoal occurs.

Example 3

The same test conditions and the same apparatus as in Example 1 are used, but with the difference that the air stream is loaded with n-butanol.

TABLE 3

| Time [hours] | Pollutant concentration [mg/m$^3$] | | | | |
|---|---|---|---|---|---|
| | Inlet air | Bio-filter 1 outlet | Degradation % | Active Bio-charcoal filter 2 | | Degradation % |
| | | | | outlet | outlet | |
| 21 | 210 | 80 | | 650 | 490 | |

TABLE 3-continued

| Time [hours] | Pollutant concentration [mg/m³] | | | | | |
|---|---|---|---|---|---|---|
| | Inlet air | Bio-filter 1 outlet | Degradation % | Active Bio-charcoal filter 2 | | Degradation % |
| | | | | outlet | outlet | |
| 8 | 3060 | 2910 | 5 | 1220 | 540 | 83 |
| 15 | 100 | 60 | | 550 | 410 | |
| 7 | 2790 | 2740 | 2 | 1560 | 790 | 72 |
| 8 | 3380 | 3180 | 6 | 960 | 310 | 91 |
| 16 | 160 | 70 | | 660 | 520 | |
| 7 | 2380 | 2140 | 10 | 1230 | 750 | 68 |
| 68 | <10 | <10 | | 130 | 20 | |
| 5 | 2590 | 1660 | 36 | 220 | 50 | 98 |
| 16 | <10 | <10 | | 140 | <10 | |
| 8 | 2470 | 1850 | 25 | 680 | 350 | 86 |
| 16 | <10 | <10 | | 400 | 230 | |
| 8 | 2470 | 1890 | 23 | 710 | 400 | 84 |
| 16 | <10 | <10 | | 220 | 120 | |
| 8 | 2300 | 1760 | 23 | 670 | 410 | 82 |
| 65 | <10 | <10 | | 120 | 20 | |
| 23 | 2280 | 1380 | 39 | 930 | 660 | 71 |

*At the underlined figures, desorption from the active charcoal occurs.

Example 4

The same test conditions and the same apparatus as in Example 1 are used, but with the difference that the air stream is loaded with n-heptane.

TABLE 4

| Time [hours] | Pollutant concentration [mg/m³] | | | | | |
|---|---|---|---|---|---|---|
| | Inlet air | Bio-filter 1 outlet | Degradation % | Active Bio-charcoal filter 2 | | Degradation % |
| | | | | outlet | outlet | |
| 8 | 1140 | 980 | 14 | 540 | 400 | 65 |
| 15 | <10 | <10 | | 200 | 100 | |
| 7 | 1610 | 1310 | 19 | 780 | 610 | 62 |
| 70 | <10 | <10 | | 260 | 140 | |
| 3 | 1880 | 1880 | 0 | 1100 | 990 | 47 |
| 4 | <10 | <10 | | 340 | 300 | |
| 16 | 550 | 530 | 4 | 450 | 370 | 33 |
| 32 | 480 | 450 | | 480 | 440 | |
| 16 | <10 | <10 | | 50 | 40 | |
| 8 | 630 | 570 | 10 | 500 | 470 | 25 |
| 72 | 310 | 250 | 19 | 230 | 210 | 32 |
| 17 | 420 | 350 | 17 | 230 | 210 | 50 |
| 25 | 45 | <10 | | 130 | 110 | |
| 24 | 390 | 300 | 23 | 240 | 210 | 46 |

*At the underlined figures, desorption from the active charcoal occurs.

What is claimed is:

1. A process for the disposal and purification of waste air loaded with pollutants, which comprises passing said waste air through a system consisting of at least one absorbent buffer and at least one biofilter, such that said pollutants are more or less uniformly released form said buffer into said biofilter.

2. A process according to claim 1, which comprises passing the waste air first through at least one buffer and then through at least one biofilter.

3. A process according to claim 1, which comprises passing the waste air first through at least one biofilter, then through at least one buffer and subsequently through at least one further biofilter.

4. A process according to claim 1, which comprises passing the waste air first through at least one buffer, then through at least one biofilter, subsequently through at least one further buffer and finally through at least one further biofilter.

5. A process according to claim 1, which comprises passing the waste air through a system which contains at least one device for moistening the biofilters.

6. A process according to claim 5, wherein said device is located upstream of a buffer/biofilter system.

7. A process according to claim 1, which comprises bringing the waste air to a temperature and pollutant concentration which are harmless to the microorganisms in the biofilters.

8. A process according to claim 1, wherein 1 m³ of waste air of a pollutant concentration of up to 50 g is passed through per m3 of biofilter volume per hour.

9. A process according to claim 1 wherein said adsorbent used is active charcoal or animal charcoal, silica gel, kieselguhr, bleaching earth, an alumina, a molecular sieve, bauxite, glass, ceramics or a mixture and the absorbent used is a high-boiling organic liquid which is homogeneously miscible with water.

10. A process according to claim 1, wherein said adsorbent used is active charcoal.

11. A process according to claim 1, wherein the pollutants in the waste air are organic or inorganic compounds or mixtures.

12. A process according to claim 1 , wherein the pollutants are organic compounds.

13. A process according to claim 12 , wherein said organic compounds are hydrocarbons or halogenated hydrocarbons such as alkanes or cycloalkanes having 1 to 12 carbon atoms, or aromatics, aldehydes, ketones, ethers, carboxylic acid esters, sulfones, alcohols, thiols, nitro compounds or amino compounds, or mixtures.

14. A process according to claim 12, wherein said organic compounds are butane, pentane, octane, heptane, cyclohexane, cyclooctane, decalin, methylene chloride, benzene, toluene, phenol, xylene, chlorobenzene, dichlorobenzene, acetone, dioxane, sulfolan, tetrahydrofuran, methyl isobutyl ketone, methanol, ethanol, butanol, pyridine, dimethylformamide, acetonitrile or mixtures.

15. A process according to claim 1, wherein the pollutants in the waste air are gases, aerosols and vapors.

16. An apparatus for the disposal and purification of waste air loaded wit pollutants, which comprise at least one adsorbant or absorbant buffer and at least one biofilter and means for passing said waste air through said buffer or buffers and at least one biofilter.

17. An apparatus according to claim 16, wherein the biofilter comprises a carrier material and microorganisms.

18. An apparatus according to claim 17, wherein said carrier material consists of compost, peat, earth, wood chips, plant residues selected from brushwood, straw, bark and heather, or a mixture thereof.

19. An apparatus according to claim 16, wherein at least one adsorbant or absorbant buffer is provided upstream of one biofilter.

20. An apparatus according to claim 16, wherein, upstream of the adsorbant or absorbant buffer, several biofilters are connected in parallel.

21. An apparatus according to claim 16, wherein, upstream of the absorbant or absorbant buffer, several biofilters are connected sequentially in the manner of a chest of drawers.

* * * * *